(12) United States Patent
Kutscher et al.

(10) Patent No.: US 6,374,193 B1
(45) Date of Patent: Apr. 16, 2002

(54) METHOD AND DEVICE FOR MONITORING THE FUNCTIONING OF A COMPRESSOR

(75) Inventors: Eberhard Kutscher, Dettenhausen; Joachim Lang, Grafenau; Gerhard Lohrmann, Asperg; Reiner Schneider, Dunningen; Udo Walter, Geislingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/232,599

(22) Filed: Jan. 19, 1999

(30) Foreign Application Priority Data

Jan. 17, 1998 (DE) .......................................... 198 01 665

(51) Int. Cl.$^7$ ................................................ B60T 17/02
(52) U.S. Cl. ...................... 702/138; 702/140; 702/182; 702/183; 303/57; 73/37; 73/39
(58) Field of Search ............................ 702/138, 33, 47, 702/50, 51, 98, 95, 100, 108, 113, 114, 190, 176–178, 182–185, 188, 189, FOR 123, FOR 124, FOR 125, FOR 128, FOR 134, FOR 135, FOR 143, FOR 170, FOR 171; 303/10, 11, 122.12, 116.4, 122.13, 122.14, 116.1, 119.1, 9.61, 115.1, 115.2, 115.4, DIG. 1, DIG. 2, DIG. 11, DIG. 3, DIG. 4, DIG. 10, 9.62, 9.63, 122.1, 22.5, 28, 57, 59, 60, 64; 417/25, 26; 73/1.57, 37, 39, 40, 40.5 R; 701/78, 70, 83; 340/614

(56) References Cited

U.S. PATENT DOCUMENTS 5,197,787 A * 3/1993 Matsuda et al. ............... 303/10
5,501,512 A * 3/1996 Hart ....................... 303/DIG. 1
5,791,745 A * 8/1998 Sakakibara ............ 303/DIG. 4

FOREIGN PATENT DOCUMENTS

DE        219 535 A1     3/1985
DE       42 11 191 A1   10/1993

* cited by examiner

*Primary Examiner*—Hal Wachsman
(74) *Attorney, Agent, or Firm*—Kenyon & Kenyon

(57) ABSTRACT

In a method for monitoring the functioning of a compressor, which charges a gas-filled accumulator chamber with a working pressure, the actual pressure prevailing in the accumulator chamber is measured and compared to a setpoint pressure. In response to a deviation in the actual pressure from the setpoint pressure, an error signal is produced. The comparison of the actual pressure and the setpoint pressure is carried out during the charging operation when the accumulator chamber is charged.

14 Claims, 3 Drawing Sheets

METHOD AND DEVICE FOR MONITORING THE FUNCTIONING OF A COMPRESSOR

FIELD OF THE INVENTION

The present invention relates to a method and a device for monitoring the functioning of a compressor, in particular a compressor used for pneumatic load-leveling of a vehicle body.

RELATED TECHNOLOGY

East German Patent Application No. 219 535 A1 discloses monitoring a pressure prevailing in the working chamber of a compressor and comparing the pressure to a predefined setpoint pressure, a deviation in the actual pressure from the setpoint pressure leading to an error signal. The actual pressure is recorded using a measuring element, and is compared in a comparator unit to the stored setpoint value determined in a previous acceptance test. The time characteristic of the actual pressure, combined with other performance quantities, provides evidence of system malfunctions. Functional errors occurring in the components of the device are able to be localized, for example, on the basis of a change in the accumulator pressure, combined with temperature information.

The setpoint value is provided as a static pressure value, not, however, as a curve profile that is variable over time. For that reason, reliable evidence of malfunctions can only be provided in a steady-state operation of the device, when the pressure in the accumulator chamber of the compressor deviates by a predetermined measure from the setpoint pressure. Dynamic fluctuations, which are not attributed to malfunctions, but rather to system-controlled processes, such as actuation or de-energizing, can be misinterpreted by the comparator unit and lead to erroneous information.

To rule out such erroneous information, the system must be monitored virtually continuously and, to compensate for the fluctuations, an average value of the actual pressure must be generated over long operating phases, and then compared to the adjusted setpoint value. This, in turn, increases the memory and computational outlay required for the comparator unit.

Additional system information can only be utilized if relevant comparison criteria, tailored to the specific system information, have been formulated and stored in advance in the comparator unit. However, this increases the outlay required for supplying, storing, and calculating data. Substantial outlay is required to make concrete inferences about the location and the nature of an error that has occurred, otherwise reliable information on malfunctions cannot be provided.

SUMMARY OF THE INVENTION

An object of the present invention is to devise a reliable method for monitoring a compressor using minimal outlay.

The present invention provides a method for monitoring the functioning of a compressor, in particular a compressor which is used for the pneumatic load-leveling of a vehicle body and which applies a working pressure to a gas-filled accumulator chamber (3). The actual pressure ($P_{actual}$) prevailing in the accumulator chamber (3) is measured and compared to a setpoint pressure ($P_{setpoint}$), and an error signal is produced in response to a deviation in the actual pressure ($P_{actual}$) from the setpoint pressure ($P_{setpoint}$). The comparison of the actual pressure ($P_{actual}$) and the setpoint pressure ($P_{setpoint}$) is carried out during the accumulator charging operation, i.e. when the accumulator chamber is charged.

The present invention also provides a device or monitoring the functioning of a compressor, in particular for implementing the method of the present invention. The device comprises a pressure sensor (5) for measuring the actual pressure ($P_{actual}$) of a gas-filled accumulator chamber (3), which is able to be charged via the compressor (2), and comprises a control unit (6), which is able to be supplied with the actual pressure ($P_{actual}$) in the form of an input signal, which is able to be compared in the control unit (6) to a setpoint signal corresponding to a setpoint pressure ($P_{setpoint}$). An error signal is able to be produced in response to a deviation that exceeds a preset tolerance value ($P_{tol}$). A control signal generated by the control unit (6) is able to be fed to the compressor (2) for charging the accumulator chamber (3) at the same time as the measurement of the actual pressure ($P_{actual}$) is performed. The setpoint-actual comparison is carried out by the device.

The accumulator chamber to be charged by the compressor advantageously supplies pneumatic functional elements, in particular the air bellows of an air spring in a motor vehicle. To obtain reliable information about the status of the compressor, it suffices in accordance with the present method that a comparison of the actual and setpoint values be performed simply during the accumulator-chamber charging processes, it being necessary to carry out these processes at regular intervals anyway. On the other hand, the need for continuously recording the operating state of the compressor and of the accumulator chamber during regular operation is eliminated, thus substantially reducing the quantity of data to be evaluated. Moreover, any fluctuations that occur during regular operation no longer play a part, so that there is no need to perform statistical compensating calculations to smooth out fluctuations in the actual pressure by generating mean values over long periods.

The characteristic curve of the setpoint pressure is known as a function of time for the entire accumulator charging process, so that the measured actual pressure can be compared continuously or quasi-continuously to the setpoint pressure during the charging operation. The setpoint pressure curve also includes the information on the change in the accumulator pressure over time, so that an error signal is produced in response to a pressure rise that deviates from the momentary setpoint value.

A tolerance band, within which no error signal is produced, is placed advantageously around the pressure setpoint curve. The nature of an error can be inferred from the deviation in the actual pressure above or below the tolerance band. If the actual pressure is underneath the tolerance band during the charging operation, i.e, the predefined pressure cannot be reached, then this suggests a leakage in the accumulator chamber, in the supply lines, discharge lines or in a valve, or to a defective compressor. If the actual pressure is above the tolerance band during the charging operation, then this suggests a blocked line or a valve that is not opening.

In accordance with the device of the present invention, the actual pressure of the accumulator chamber is recorded using a pressure sensor and fed as an input signal to a control unit, where the input signal is compared to a setpoint signal indicative of the setpoint pressure. This takes place contemporaneously with the compressor charging the accumulator chamber. Accordingly, the accumulator charging operation and the measuring process, inclusive of the evaluation, are coupled to one another via the hardware, so that tests can be performed at regular intervals, and the amount of data to be evaluated will nevertheless remain within limits.

The pressure in the accumulator chamber rises nonlinearly; as accumulator pressure increases, the characteristic pressure curve becomes flatter. The characteristic setpoint pressure curve can be expressed as a function of time as a second-degree polynomial, the three coefficients of the polynomial being advantageously uniquely defined on the basis of a reference device, which includes a reference compressor with a corresponding accumulator chamber, by measuring three pressure/time measuring pairs during one unique accumulator charging process, and then being stored in the control unit. This polynomial describing the characteristic setpoint pressure can be used as a reference for compressors of a similar design.

The non-linear rise in the characteristic pressure curve necessitates that only the same setpoint segments and actual-pressure segments be compared during the accumulator charging process. Since the pressure drop in the accumulator chamber is a function of a lower pressure value from the particular sampled pressure, the lower pressure value is to be considered as the initial pressure for the setpoint/actual comparison, by effectively expressing the setpoint pressure as a function of the initial pressure and of the differential pressure. The differential pressure of the characteristic setpoint-pressure curve can be expressed from transformations from the second-degree polynomial as a function of the initial pressure and of the time difference that has elapsed between the measurement of the initial pressure and the measurement of the instantaneous actual pressure. Through this transformation, one selects only that segment of interest from the entire characteristic setpoint-pressure curve, assuming an initial pressure that changes with every new operation, and compares this segment to the corresponding actual values.

BRIEF DESCRIPTION OF THE DRAWINGS

Further advantages of the present invention can be inferred from the description of the drawings, in which.

DETAILED DESCRIPTION

Figure 1:
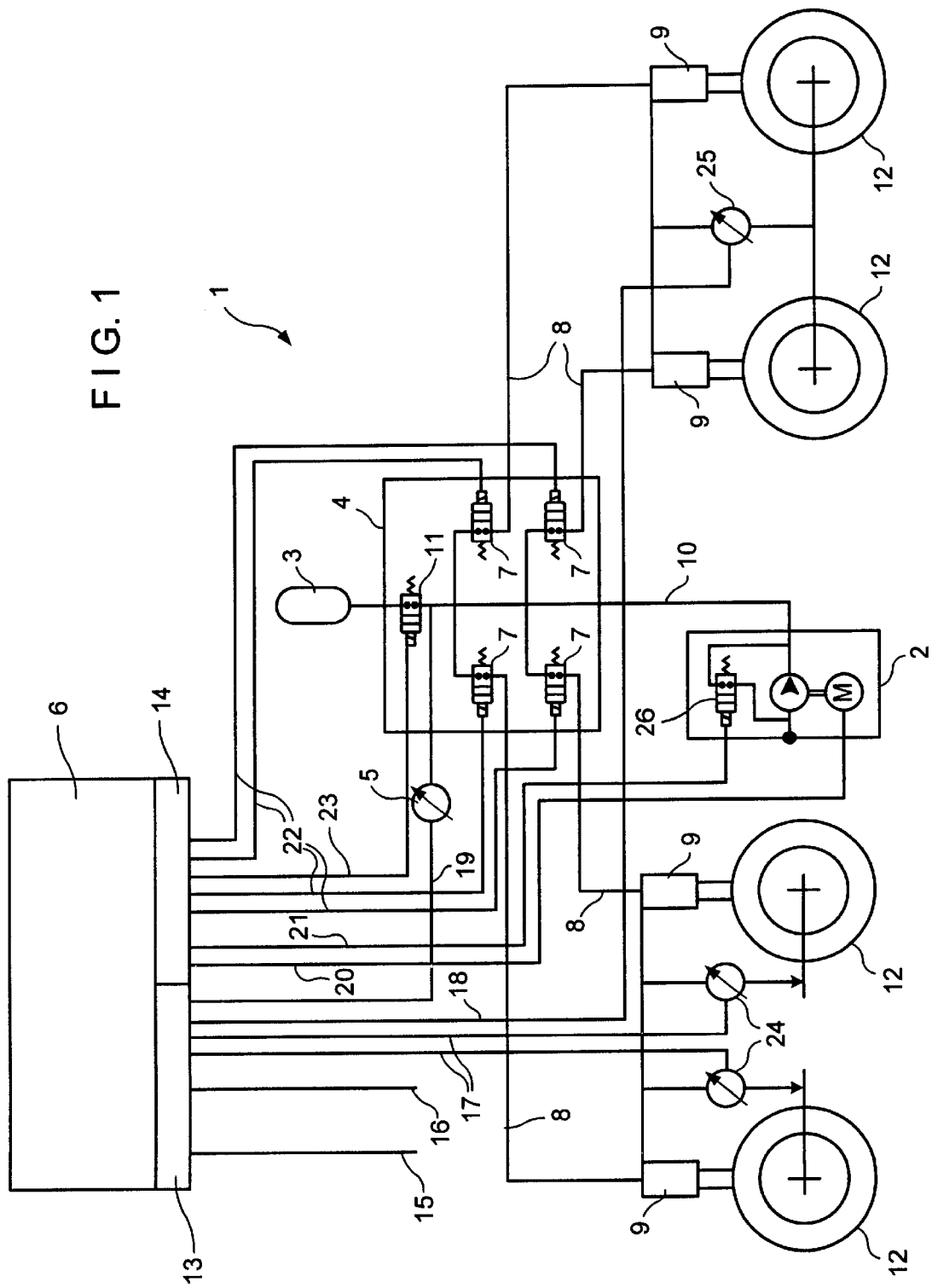
FIG. 1 shows a pneumatic circuit diagram for the load-leveling of a motor vehicle body.

Device 1 depicted in FIG. 1 includes a compressor 2 and a separate gas-filled accumulator chamber 3, designed as a central accumulator. A valve block 4 is assigned to the central accumulator. Compressor 2 is coupled via a main line 10 to accumulator chamber 3 and charges accumulator chamber 3 with a predefined working pressure. Accumulator chamber 3 is coupled via pressure lines 8 to functional elements 9, which are charged with the working pressure prevailing in accumulator chamber 3. In the illustrated exemplary embodiment, functional elements 9 are air springs, which have corresponding air bellows and are arranged between the body and wheels 12 of a motor vehicle. Functional elements 9 are mounted both at the front-axle wheels as well as at the rear-axle wheels.

Functional elements 9 are used for the suspension and the load-leveling of the motor-vehicle body, in that in response to a dipping motion of the body in the vicinity of one or more wheels, the level of the vehicle body is raised by charging the particular functional element 9 with the working pressure of accumulator chamber 3.

To control device 1, provision is made for a control unit 6 which includes an input signal block 13 and an output signal block 14, input signal lines 15 through 19 being assigned to input signal block 13 and output signal lines 20, 21, 22 and 23 being assigned to output signal block 14.

Via input signal lines 15, 16, internal state variables of the vehicle, in particular kinematic variables such as the vehicle velocity or the steering angle, are fed to control unit 6. The two input signal lines 17 transmit the signal generated by height or load sensors 24 located at the front axle in the clearance between the two front wheels and the body, to control unit 6. Correspondingly, input signal line 18 transmits the level signal of a height or load sensor 25 mounted at the rear axle. Input signal line 19 transmits actual pressure $P_{actual}$ as an input signal that is generated in a pressure sensor 5 which measures the pressure in main line 10 between compressor 2 and accumulator chamber 3.

Motor M which drives compressor 2 is controlled via output signal line 20. Output signal line 21 acts upon a discharge valve 26 in compressor 2. In addition, four output signal lines 22 are provided, which each control a valve 7 in valve block 4; each valve 7 is located in a pressure line 8 leading, in each case, to a functional element 9. Finally, via output signal line 23, control unit 6 supplies an output signal for controlling a central accumulator valve 11, which is likewise arranged in valve block 4 and which is used to shut off main line 10 between compressor 2 and accumulator chamber 3.

The method of functioning of the device and the interaction of the individual components are described in the following.

Via input signal lines 15 through 19, control unit 6 picks up internal state variables of the system. When a dipping motion is registered by height sensors 24, 25, pressure from accumulator chamber 3 and/or from compressor 2 is supplied to the appropriate pneumatic functional elements. For this, valves 7 in valve block 4 are switched into the open position, so that the working pressure in accumulator chamber 3 is transferred to functional elements 9. Some instances may call for closing central accumulator valve 11, thereby cutting off accumulator chamber 3, so that only pressure from the compressor is supplied to the functional elements.

When the pressure measured in pressure sensor 5 falls below a preset limit in accumulator chamber 3, accumulator chamber 3 is recharged. Alternatively, the accumulator charging operation can also be triggered at regular time intervals, independently of the level of the momentary pressure prevailing in accumulator chamber 3. During the accumulator charging operation, central accumulator valve 11 is in the open position; on the other hand, valves 7 are switched into the closed position to uncouple functional elements 9 from the accumulator charging operation.

Figure 2:
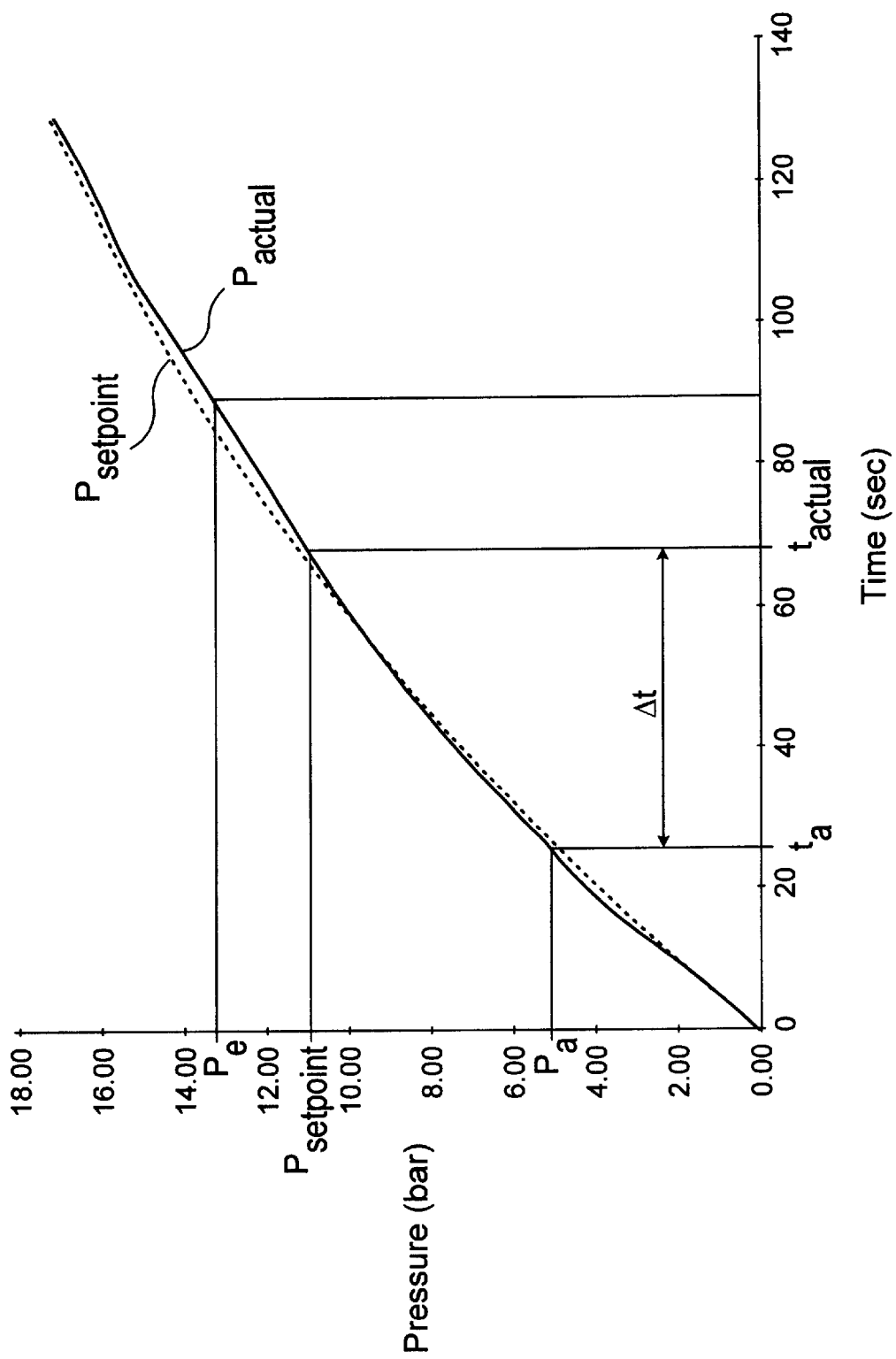
FIG. 2 shows a diagram including a measured and calculated characteristic pressure curve.

The accumulator charging operation begins at an initial value $P_a$ which defines a minimum, as shown in FIG. 2, in that compressor 2 is put into operation by a start signal via output signal line 20; at the same time discharge valve 26 assigned to the compressor is closed. The accumulator charging operation is continued until the pressure prevailing in accumulator chamber 3 reaches the predefined working pressure, final value $P_e$.

To obtain information about the state of the compressor, inclusive of the corresponding aggregates, provision is made for the pressure in the accumulator chamber to be measured during the accumulator charging operation and compared to a predefined setpoint curve of setpoint pressure $P_{setpoint}$. Deviations which exceed a permissible degree result in an error signal. In this context, one can infer the nature of the error that has occurred from the operational (plus or minus) sign of the deviation.

If the deviation is higher than a permissible tolerance value $P_{tol}$, then the measured actual pressure $P_{actual}$ in the accumulator chamber is greater than the sum of setpoint pressure $P_{setpoint}$ and tolerance value $P_{tol}$, which means that actual pressure $P_{actual}$ is unacceptably high. This deviation indicates that central accumulator valve 11 is not opening, that the line section of main line 10 between compressor 2 and valve block 4 is blocked, or that the line section of main line 10 between valve block 4 and accumulator chamber 3 is blocked.

If the deviation is below the permissible tolerance value $P_{tol}$, then the measured actual pressure $P_{actual}$ in the accumulator chamber is less than the difference between setpoint pressure $P_{setpoint}$ and tolerance value $P_{tol}$; this means that actual pressure $P_{actual}$ is unacceptably low and the required working pressure cannot be reached. Possible faults are a defective compressor 2, a leaky accumulator chamber 3, or a leaky main line 10 in the line section between compressor 2 and valve block 4, or between valve block 4 and accumulator chamber 3.

The setpoint curve for the pressure rise is determined on the basis of a reference compressor with the corresponding accumulator chamber. The pressure rise in the accumulator chamber can be described by approximation, as a function of time, using a second-degree polynomial, expressed as $$P_{setpoint}(t) = a_2 * t^2 + a_1 * t + a_0,$$

the polynomial coefficients $a_0$, $a_1$, $a_2$ being defined by measuring pressure $P_1$, $P_2$, $P_3$ prevailing in the accumulator chamber of the reference compressor at three different instants $t_1$, $t_2$, $t_3$, and by calculating the coefficients of the polynomial are in accordance with the relations $$a_2 = \frac{(P_1 - P_3)*(t_2 - t_3) - (P_2 - P_3)*(t_1 - t_3)}{(t_1 - t_3)*(t_2 - t_3)*(t_1 - t_2)} \text{ or}$$

$$a_2 = \frac{P_1}{(t_1 - t_3)*(t_1 - t_2)} - \frac{P_2}{(t_2 - t_3)*(t_1 - t_2)} - \frac{P_3}{(t_1 - t_3)*(t_2 - t_3)},$$

$$a_1 = (P^1 - P_3)/(t_1 - t_3) - a_2*(t_1 + t_3),$$

$$a_0 = P_1 - a_2 * t_1^2 - a_1 * t_1$$

The calculated polynomial coefficients are stored in a memory of control unit 6 and retrieved for calculating the setpoint pressure rise during the accumulator charging operation.

FIG. 2 illustrates a comparison between the calculated pressure characteristic $P_{setpoint}$ and the measured pressure characteristic $P_{actual}$ of a reference compressor; the deviation between the setpoint and actual pressure is, at a maximum, in the single-digit percentile range.

Since initial pressure $P_a$ prevailing at the beginning of the accumulator charging operation is not the same for every accumulator charging operation, the relevant segment of the setpoint curve must be considered in each case due to the non-linearity of the pressure rise, to enable a setpoint/actual comparison to be made. For this, the second-degree polynomial of the setpoint pressure is transformed so as to enable setpoint pressure $P_{setpoint}$, starting from the initial pressure $P_a$ in question measured at the beginning of an accumulator charging operation, to be calculated by adding a setpoint differential pressure $\Delta P_{setpoint}$. In this context, setpoint differential pressure $\Delta P_{setpoint}$ is a function of polynomial coefficients $a_0$, $a_1$, $a_2$, of the measured initial pressure $P_a$, and of time period $\Delta t$ that has elapsed between instant $t_a$ at the beginning of the accumulator loading operation and the current instant tactual (compare FIG. 2):

$$\Delta t = t_{actual} - t_a,$$

$$\Delta P_{setpoint} = \Delta t * \{a_2 * \Delta t + [a_1^2 - 4*a_2*(a_0 - P_a)]^{1/2}\}.$$

From this information, setpoint pressure $P_{setpoint}$ can be determined by superpositioning initial pressure $P_a$ and weighted setpoint differential pressure $\Delta P_{setpoint}$ of setpoint pressure $\Delta P_{setpoint}$ ambient pressure $P_{amb}$ being considered by the weighting of setpoint differential pressure $\Delta P_{setpoint}$:

$$P_{setpoint} = P_a + (m*P_{amb} + b)*\Delta P_{setpoint}.$$

Here, m designates a factor for considering for the ambient pressure, and b a constant for considering for the ambient pressure. Setpoint pressure $P_{setpoint}$ can be calculated after initial pressure $P_a$ is measured and after the ambient pressure is determined for each point of reference $t_{actual} = t_a + \Delta t$.

Figure 3:
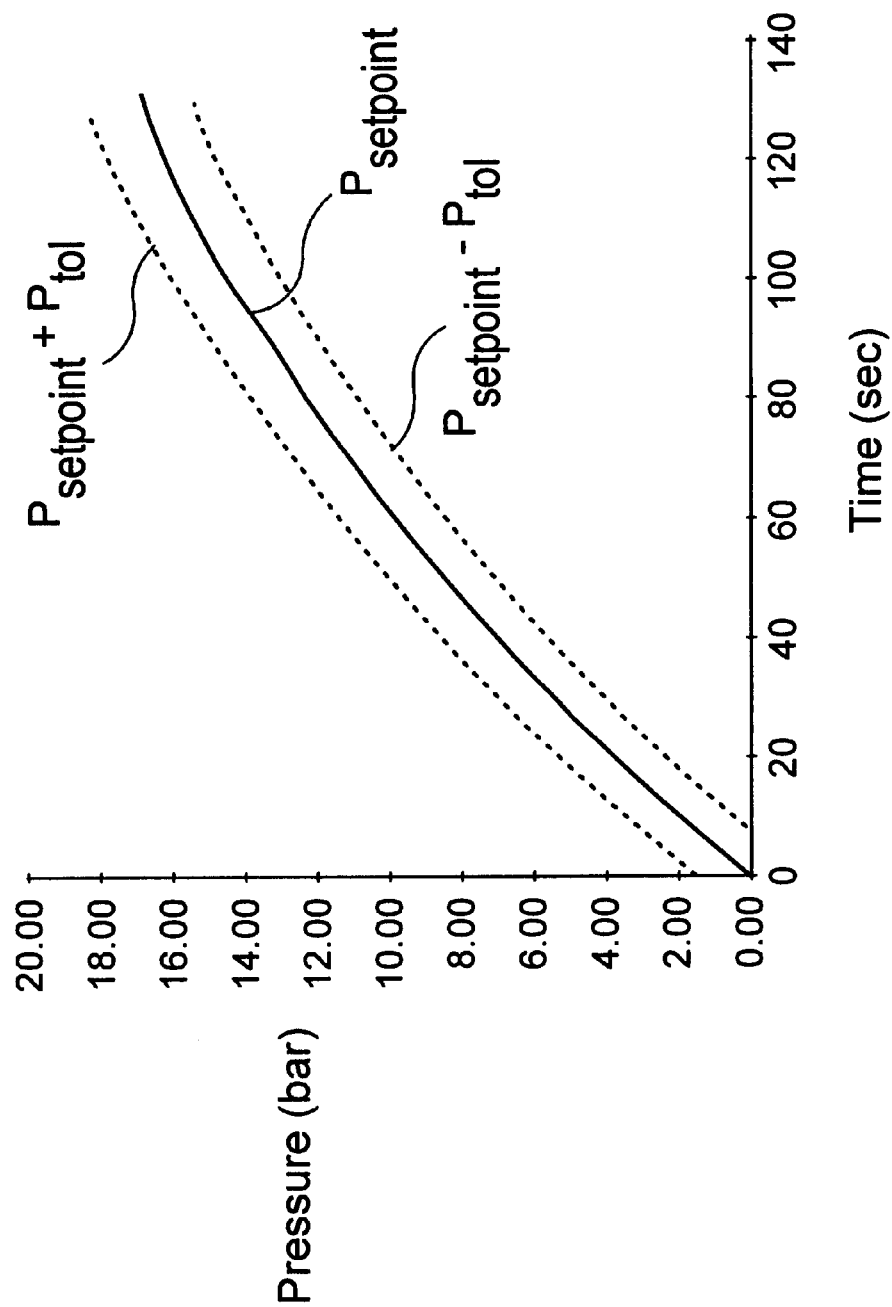
FIG. 3 shows a diagram including a setpoint pressure rise and a superimposed tolerance band.

The current measured actual pressure $P_{actual}$ is compared in control unit 6 to setpoint pressure $P_{setpoint}$, a tolerance band being placed around the setpoint curve in accordance with FIG. 3, by adding tolerance value $P_{tol}$ to setpoint pressure $P_{setpoint}$ or subtracting it therefrom. Actual pressure $P_{actual}$ must not lie outside of the tolerance band, otherwise an error signal is produced at control unit 6 and, if indicated, the accumulator charging operation is discontinued.

| Reference Symbol List | |
|---|---|
| 1 | Device |
| 2 | Compressor |
| 3 | Accumulator chamber |
| 4 | Valve block |
| 5 | Pressure sensor |
| 6 | Control unit |
| 7 | Valve |
| 8 | Pressure line |
| 9 | Functional element |
| 10 | Main line |
| 11 | Central accumulator valve |
| 12 | Wheel |
| 13 | Input signal block |
| 14 | Output signal block |
| 15–19 | Input signal line |
| 20–23 | Output signal line |
| 24, 25 | Height or level sensor |
| 26 | Discharge valve |

What is claimed is:

1. A method for monitoring functioning of a compressor, the compressor for applying a working pressure to a gas-filled accumulator chamber and for charging the accumulator chamber during an accumulator charging operation, the method comprising the steps of:

measuring an actual pressure in the accumulator chamber;

comparing the actual pressure to a setpoint pressure only during the accumulator charging operation, the setpoint pressure being obtainable from a characteristic setpoint pressure curve $P_{setpoint}(t) = a_2 * t^2 + a_1 * t + a_0$, where t is time and coefficients $a_0$, $a_1$, $a_2$ are predefinable using a reference compressor having a corresponding reference accumulator chamber; and producing an error signal in response to a deviation of the actual pressure from the setpoint pressure.

2. The method as recited in claim 1 wherein the coefficients $a_0$, $a_1$, $a_2$ are defined during a charging of the corresponding reference accumulator chamber.

3. The method as recited in claim 1 further comprising measuring pressures $P_1$, $P_2$, $P_3$ in the corresponding reference accumulator chamber at three different instants $t_1$, $t_2$, $t_3$ respectively, the coefficients being defined in accordance with relations:

$$a_2 = \frac{(P_1 - P_3)*(t_2 - t_3) - (P_2 - P_3)*(t_1 - t_3)}{(t_1 - t_3)*(t_2 - t_3)*(t_1 - t_2)},$$

$$a_1 = (P_1-P_3)/(t_1-t_3) - a_2*(t_1+t_3),$$

$$a_0 = P_1 - a_2*t_1^2 - a_1*t_1.$$

4. The method as recited in claim 1 further comprising measuring an initial pressure in the accumulator chamber prior to the accumulator charging operation.

5. The method as recited in claim 4 wherein the setpoint pressure $P_{setpoint}$ is determined from the measured initial pressure $P_a$ and a calculated setpoint differential pressure $\Delta P_{setpoint}$, while allowing for an ambient pressure $P_{amb}$, in accordance with $$P_{setpoint} = P_a + (m*P_{amb}+b)*\Delta P_{setpoint},$$

where m is a factor for considering the ambient pressure, and b is a constant for considering the ambient pressure.

6. The method as recited in claim 5 wherein the calculated setpoint differential pressure is determined as a function of the measured initial pressure and of a time difference $\Delta t$ between an instant $t_a$ when the initial pressure $P_a$ is measured and an actual instant $t_{actual}$ when a momentary actual pressure $P_{actual}$ is measured, in accordance with $$\Delta t = t_{actual} - t_a,$$

$$\Delta P_{setpoint} = \Delta t * \{a_2*\Delta t + (a_1^2 - 4*a_2*\{a_0-P_a\})^{1/2}\}.$$

7. The method as recited in claim 1 further comprising predefining a tolerance value, the error signal being produced when the deviation exceeds the tolerance value.

8. The method as recited in claim 1 wherein the compressor is used for pneumatic load-leveling of a vehicle body.

9. A device for monitoring a compressor, the compressor for applying a working pressure to a gas-filled accumulator chamber and for charging the accumulator chamber during an accumulator charging operation, the device comprising:

a pressure sensor for measuring an actual pressure of the accumulator chamber; and a control unit receiving an input signal from the pressure sensor and for comparing the input signal to a setpoint signal corresponding to a setpoint pressure, an error signal being produced in response to a deviation between the input signal and the setpoint signal exceeding a preset tolerance value, the control unit having an output for a control signal generated by the control unit, the control signal being fed to the compressor at the same time the pressure sensor measures the actual pressure and the comparing is performed, the setpoint signal corresponding to a setpoint pressure value stored in the control unit as a second-degree polynomial having three coefficients $a_0$, $a_1$, $a_2$.

10. The device as recited in claim 9 further comprising a valve block assigned to the accumulator chamber, the valve block including a plurality of valves in pressure lines coupling the accumulator chamber to pneumatic functional elements.

11. The device as recited in claim 10 wherein branching off from the accumulator chamber is a main line, the compressor being coupled via the main line to the accumulator chamber, the pressure lines being connected to the main line.

12. The device as recited in claim 11 wherein the valve block has a central accumulator valve arranged in the main line.

13. The device as recited in claim 11 wherein the pressure sensor receives pressure from the main line.

14. The device as recited in claim 9 wherein the setpoint signal is able to be determined as a function of the three coefficients $a_0$, $a_1$, $a_2$, of an initial pressure $P_a$ in the accumulator chamber, and of a time difference $\Delta t$.

* * * * *